(12) United States Patent
Kato et al.

(10) Patent No.: US 8,933,183 B2
(45) Date of Patent: Jan. 13, 2015

(54) MANUFACTURING METHOD OF (METH) ACRYLIC POLYMER

(75) Inventors: Yasunaka Kato, Settsu (JP); Kenichi Yoshihashi, Settsu (JP)

(73) Assignee: Kaneka Corporation, Osaka (JP)

( * ) Notice: Subject to any disclaimer, the term of this patent is extended or adjusted under 35 U.S.C. 154(b) by 74 days.

(21) Appl. No.: 13/816,319

(22) PCT Filed: Jul. 25, 2011

(86) PCT No.: PCT/JP2011/004161
§ 371 (c)(1),
(2), (4) Date: Apr. 11, 2013

(87) PCT Pub. No.: WO2012/020545
PCT Pub. Date: Feb. 16, 2012

(65) Prior Publication Data
US 2013/0197175 A1  Aug. 1, 2013

(30) Foreign Application Priority Data
Aug. 10, 2010  (JP) .................................. 2010-179567

(51) Int. Cl.
*C08F 20/10* (2006.01)
*C08F 4/50* (2006.01)
*C08F 4/40* (2006.01)
*C08F 220/18* (2006.01)

(52) U.S. Cl.
CPC . *C08F 20/10* (2013.01); *C08F 4/40* (2013.01); *C08F 220/18* (2013.01); *C08F 4/50* (2013.01)
USPC .......................................... 526/147; 526/319

(58) Field of Classification Search
CPC .................................. C08F 20/10; C08F 4/50
USPC .................................................. 526/147, 319
See application file for complete search history.

(56) References Cited

U.S. PATENT DOCUMENTS

| 2007/0276101 A1 | 11/2007 | Matyjaszewski et al. |
| 2009/0156771 A1 | 6/2009 | Shen et al. |
| 2009/0312505 A1* | 12/2009 | Matyjaszewski et al. ...... 526/90 |

FOREIGN PATENT DOCUMENTS

| JP | 11-193307 A | 7/1999 |
| JP | 2004-155846 A | 6/2004 |
| JP | 2005-307220 A | 11/2005 |
| JP | 2006-299236 A | 11/2006 |
| JP | 2007-023136 A | 2/2007 |
| JP | 2007-527463 A | 9/2007 |
| JP | 2008-266658 A | 11/2008 |
| WO | 96/30421 A1 | 10/1996 |
| WO | 97/18247 A1 | 5/1997 |
| WO | 2005/087819 A1 | 9/2005 |
| WO | 2007/075817 A1 | 7/2007 |
| WO | 2008/019100 A2 | 2/2008 |

OTHER PUBLICATIONS

Translation of the International Preliminary Report on Patentability (PCT/ISA/237) (7 pages), (PCT/IB/373) (1 page) of International Application No. PCT/JP2011/004161, issued Mar. 12, 2013.
International Search Report of PCT/JP2011/004161, mailing date Oct. 18, 2011.

* cited by examiner

*Primary Examiner* — Vu A Nguyen
(74) *Attorney, Agent, or Firm* — Westerman, Hattori, Daniels & Adrian, LLP

(57) ABSTRACT

In a method for polymerizing a (meth)acrylic monomer by living radical polymerization in the presence of a transition metal complex catalyst, the combined use of a multidentate amine (A), a base (B) and a reducing agent (C) makes it possible to achieve a rapid polymerization reaction and high monomer conversion rate and obtain a polymer having a narrow molecular weight distribution when 5-30 ppm by weight of copper atoms and a mole amount of 7 mmol % or less of multidentate amine (A) are used, each based on the total amount of (meth)acrylic monomer introduced.

10 Claims, No Drawings

MANUFACTURING METHOD OF (METH) ACRYLIC POLYMER

TECHNICAL FIELD

The present invention relates to a living radical polymerization method for polymerizing a (meth)acrylic monomer.

BACKGROUND ART

As a method for producing a (meth)acrylic polymer, atom transfer radical polymerization (ATRP) has been found which is a living radical polymerization process that uses, for example, a transition metal complex consisting of a transition metal or transition metal compound and a multidentate amine as the polymerization catalyst (see Patent Literatures 1 and 2). However, these patent literatures disclose no means for reducing the amount of the polymerization catalyst to the order of several hundred ppm based on the monomer weight. In the case of using the above-mentioned technique industrially, since the large amount of transition metal or transition metal compound and transition metal complex used as the catalyst, for example, causes discoloration of the polymer, inhibits a reaction for introducing functional groups, or causes a contact fault when used in electrical parts, it is necessary to remove. However, the removal of the transition metal compound requires extremely a large amount of labor and costs (Patent Literatures 3 to 5).

In this context, it has recently been found that the polymerization is allowed to proceed with several tens of ppm of transition metal atoms by activators regenerated by electron transfer atom transfer radical polymerization (ARGET ATRP) (see Patent Literature 6), in which a reducing agent is characteristically used to reduce the amount of highly oxidized transition metal complexes whose accumulation causes retardation or termination of polymerization; or by single electron transfer living radical polymerization (SET LRP) (see Patent Literature 7), in which a transition metal is characteristically allowed to disproportionate in a highly polar solvent.

In addition, the polymerization has also been found to proceed with a concentration of transition metal atoms as dilute as from several tens to several hundred ppm based on monomer by, for example, using a transition metal complex catalyst containing a halogen atom of a higher period in the periodic table than that of a halogen atom at the end of an initiator (see Patent Literature 8); combining two types of multidentate amines (see Patent Literature 9); or adding an amine in excess relative to a metal catalyst (see Patent Literatures 9 and 10).

CITATION LIST

Patent Literature

Patent Literature 1: WO 96/30421
Patent Literature 2: WO 97/18247
Patent Literature 3: JP 2004-155846 A
Patent Literature 4: JP 2005-307220 A
Patent Literature 5: JP H11-193307 A
Patent Literature 6: WO 2005/087819
Patent Literature 7: WO 2008/019100
Patent Literature 8: JP 2006-299236 A
Patent Literature 9: JP 2007-23136 A
Patent Literature 10: US 2009/0156771

SUMMARY OF INVENTION

Technical Problem

Problems encountered in industrializing ATRP technique are production productivity, raw material costs and purification of the polymer. In response to these problems, some improved methods have been reported. However, these methods still do not solve the problems of productivity, raw material costs and purification. Moreover, in the case of industrial production, it is necessary for most of the raw materials to be recycled. For this reason, since various compounds resulting from by-products and due to deterioration of the raw materials contaminate the reaction system, it is necessary to design the formulation in consideration of these contaminants.

Among living radical polymerization methods including the polymerization of a (meth)acrylic monomer in the presence of a copper complex as the polymerization catalyst, ARGET ATRP which characteristically also uses a reducing agent as a promoter (WO 2005/087819) is able to reduce the amount of copper atoms to not more than 50 ppm by weight based on the (meth)acrylic monomer. However, when a multidentate amine is only added in roughly an equimolar amount relative to the copper atoms, the polymerization would not proceed to a high monomer conversion rate, and the resulting polymer has a broader molecular weight distribution. Hence, in the ARGET ATRP, the multidentate amine is added in an excess amount of 200 mol % to 1000 mol % based on the copper atoms, and the polymerization is allowed to proceed to a high monomer conversion rate, whereby a polymer is obtained having a narrow molecular weight distribution. Accordingly, although the conventional ARGET ATRP is able to reduce the amount of copper of the catalyst, it is unable to considerably reduce the amount of multidentate amine. In addition, unless the polymerization is slowed correspondingly as the amount of copper is reduced, it is not possible to control the polymerization reaction and obtain a polymer having a narrow molecular weight distribution. In this context, in order to achieve a rapid polymerization and obtain a polymer having a narrow molecular weight distribution, it has been found to be effective to select specific multidentate amines having large equilibrium constants between the active and dormant species in the ATRP mechanism (J. Am. Chem. Soc., 2008, 130, 10702). However, since these specific multidentate amines are difficult to acquire industrially, there are limitations on their usage, thereby preventing them from being used in excess as is attempted in ARGET ATRP. Moreover, many multidentate amines are characterized by having a high boiling point and high lipophilicity. Consequently, they are difficult to remove by evaporation or oil-water separation, which may lead to discoloration of the polymer. In other words, the use of a large amount of multidentate amine is also not desirable from the viewpoint of purification of the polymer.

Meanwhile, another case has been reported in which the polymerization is allowed to proceed by concomitantly using an amine compound such as triethylamine as a reducing agent, despite of using a catalyst system with a concentration of copper atoms as low as 70 ppm by weight based on the total weight of monomers forming the polymer, and a multidentate amine only in an equimolar amount relative to the transition metal atoms (US 2009/0156771). In the case of this formulation, however, the polymerization activity is inadequate due to a great decrease in the reaction velocity when the amount of transition metal complex is further reduced. In addition, although it has also been reported that the polymerization is allowed to proceed without the addition of triethylamine or the like, by using the highly active multidentate amine, N,N, N',N'-tetrakis(2-pyridylmethyl)ethylenediamine (TPEN), this formulation still does not achieve an adequate polymerization velocity and a high monomer conversion rate when the amount of copper atoms is further reduced below 70 ppm. In addition, yet another case has been reported in which by using a chloride as the initiator and a bromide as the copper catalyst and also combining two types of multidentate amines, the polymerization is allowed to proceed to a high monomer conversion rate, even when the copper atom level is 30 ppm, whereby a polymer having a narrow molecular weight distribution can be obtained (JP 2007-23136 A). However, since a long period of time of 12 to 24 hours is required to reach a high monomer conversion rate, this formulation has problems in terms of the reaction velocity.

As has been described above, in the case of reducing the amount of copper atoms to 30 ppm or less and only using roughly an equimolar amount of multidentate amine relative to that, since a formulation has yet to be found that makes it possible to reach a high monomer conversion rate at an adequate polymerization velocity, there is the problem of the resulting process having poor productivity in industrial applications.

In order to obtain a polymer having a narrow molecular weight distribution through the mechanism of living radical polymerization, a reaction is important that temporarily causes polymerization to enter a dormant mode by returning the halogen to the radical at the polymer end. However, this temporary radical termination causes a decrease in the reaction velocity. Consequently, it is difficult to obtain a polymer having a narrow molecular weight distribution at a polymerization velocity high enough to reach a high monomer conversion rate in a short period of time.

Thus, an object of the present invention is to allow, in a living radical polymerization method including the polymerization of a (meth)acrylic monomer in the presence of a copper complex as the polymerization catalyst, the polymerization to proceed to a high monomer reaction rate in a short period of time under conditions of low catalyst concentration in which the weight of copper atoms is 30 ppm or less based on the total weight of (meth)acrylic monomer, and the mole amount of multidentate amine is roughly an equimolar amount relative to the total amount of copper atoms; and thereby to produce a polymer having a narrow molecular weight distribution.

Solution to Problem

As a result of conducting extensive studies to solve the above-mentioned problems, the inventors of the present invention have found that the above-mentioned object can be achieved by the combined use of a base and reducing agent even under conditions of low catalyst concentration in which the weight of copper atoms is 5 ppm to 30 ppm based on the total weight of (meth)acrylic monomer, and the amount of multidentate amine is 150 mol % or less based on the total amount of copper atoms and is also 7 mmol % or less based on the total amount of (meth)acrylic monomer, thereby leading to completion of the present invention.

Specifically, the present invention relates to a method for producing a (meth)acrylic polymer, including living radical polymerization of a (meth)acrylic monomer in the presence of a copper complex catalyst, wherein, based on the total amount of (meth)acrylic monomer introduced, 5 to 30 ppm by weight of copper atoms and a mole amount of 7 mmol % or less of a multidentate amine (A) are contained, the multidentate amine (A) being in an amount of 150 mol % or less based on the total amount of copper atoms, wherein a base (B) other than the multidentate amine (A), and a reducing agent (C) are contained in a reaction system, and wherein the resulting (meth)acrylic polymer has a molecular weight distribution of 1.1 to 1.8.

The present invention relates to the method for producing a (meth)acrylic polymer, wherein the multidentate amine (A) is represented by general formula (1):

wherein $R^1$, $R^2$ and $R^3$ each independently represent a group of general formula (2) or general formula (3):

wherein $R^4$, $R^5$, $R^6$ and $R^7$ each independently represent a hydrogen atom or an alkyl group having 1 to 3 carbon atoms, or

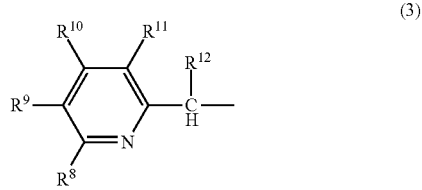

wherein $R^8$, $R^9$, $R^{10}$, $R^{11}$ and $R^{12}$ each independently represent a hydrogen atom or an alkyl group having 1 to 3 carbon atoms.

The present invention relates to the method for producing a (meth)acrylic polymer, wherein the multidentate amine (A) is represented by general formula (4):

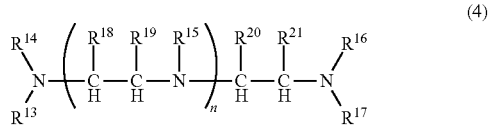

wherein n represents a number of 0 to 3; $R^{18}$, $R^{19}$, $R^{20}$ and $R^{21}$ each independently represent a hydrogen atom or an alkyl group having 1 to 3 carbon atoms; and $R^{13}$, $R^{14}$, $R^{15}$, $R^{16}$ and $R^{17}$ each independently represent a group of general formula (2) or general formula (3):

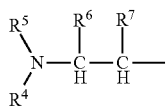

(2)

wherein $R^4$, $R^5$, $R^6$ and $R^7$ each independently represent a hydrogen atom or an alkyl group having 1 to 3 carbon atoms, or

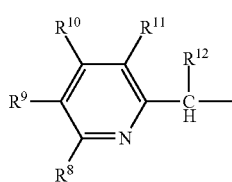

(3)

wherein $R^8$, $R^9$, $R^{10}$, $R^{11}$ and $R^{12}$ each independently represent a hydrogen atom or an alkyl group having 1 to 3 carbon atoms.

The present invention relates to the method for producing a (meth)acrylic polymer, wherein the base (B) is a monoamine compound.

The present invention relates to the method for producing a (meth)acrylic polymer, wherein the base (B) is an inorganic compound.

The present invention relates to the method for producing a (meth)acrylic polymer, wherein the base (B) is a base represented by general formula (5):

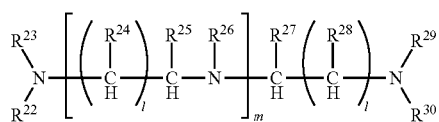

(5)

wherein m and l each independently represent a number of 0 to 3; and $R^{22}$, $R^{23}$, $R^{24}$, $R^{25}$, $R^{26}$, $R^{27}$, $R^{28}$, $R^{29}$ and $R^{30}$ each independently represent a hydrogen atom or an alkyl group having 1 to 3 carbon atoms.

Moreover, the present invention relates to the method for producing a (meth)acrylic polymer, wherein the copper atoms are mixed with the multidentate amine (A) and then with the base (B).

The present invention relates to the method for producing a (meth)acrylic polymer, wherein the reducing agent (C) is a metal, an organic tin compound, ascorbic acid, an ester of ascorbic acid, an ascorbic acid salt, hydrazine or a borohydride.

The present invention relates to the method for producing a (meth)acrylic polymer, wherein the reducing agent (C) is a hydride reducing agent.

The present invention relates to the method for producing a (meth)acrylic polymer, wherein the reducing agent (C) is hydrazine, ascorbic acid, an ester of ascorbic acid or an ascorbic acid salt.

The present invention relates to the method for producing a (meth)acrylic polymer, wherein the reducing agent (C) is ascorbic acid, an ester of ascorbic acid or an ascorbic acid salt.

The present invention relates to the method for producing a (meth)acrylic polymer, wherein the base (B) is present in the reaction system, in an amount of 100 mol % or more based on the amount of electrons transferred by the reducing agent (C) present in the reaction system.

The present invention relates to the method for producing a (meth)acrylic polymer, wherein the copper atoms are mixed with the base (B) either simultaneously with or prior to mixing with the reducing agent (C).

The present invention relates to the method for producing a (meth)acrylic polymer, wherein the length of time from the beginning of mixing of all of the metal copper or copper compound, the multidentate amine (A), the base (B) and the reducing agent (C) until the conversion rate of the (meth) acrylic monomer reaches 85% or more is 360 minutes or less.

Advantageous Effects of Invention

In the production method of the present invention, by the combined use of a base and a reducing agent, it is possible in the synthesis of a (meth)acrylic polymer to allow a polymerization reaction to proceed to a high conversion rate of (meth) acrylic monomer in a short period of time, and thereby obtain a polymer having a narrow molecular weight distribution, even when extremely small amounts of copper and multidentate amine are used.

DESCRIPTION OF EMBODIMENTS

<Living Radical Polymerization>

The present invention relates to a method for polymerizing a (meth)acrylic monomer by living radical polymerization which uses a transition metal complex catalyst composed of a transition metal or transition metal compound and a ligand.

Two approaches are currently considered for living radical polymerization using a transition metal complex catalyst, namely, atom transfer radical polymerization (ATRP) (J. Am. Chem. Soc. 1995, 117, 5614; Macromolecules, 1995, 28, 1721) and single electron transfer polymerization (SET-LRP) (J. Am. Chem. Soc. 2006, 128, 14156; JPS Chem 2007, 45, 1607). ATRP, in the case of a copper complex, for example, involves a monovalent copper complex extracting a halogen from the end of a polymer to generate a radical while forming a divalent copper complex. The divalent copper complex returns the halogen to the radical at the polymerizing end to form a monovalent copper complex. ATRP is a living radical polymerization involving equilibrium therebetween. On the other hand, SET LRP, in the case of a copper complex, involves zero valent metal copper or copper complex extracting a halogen from the end of a polymer to generate a radical while forming a divalent copper complex. The divalent copper complex returns the halogen to the radical at the polymerizing end to form a zero valent copper complex. A monovalent copper complex undergoes disproportionation to form a zero valent and divalent copper complexes. SET LRP is a living radical polymerization involving equilibrium therebetween. Although the system according to the present invention may be interpreted as either of these living radical polymerization systems, there is no particular distinction made between the two in the present invention, and living radical polymerization systems that use a transition metal or transition metal compound and a ligand as the catalyst are considered to be within the scope of the present invention.

In addition, although a method known as activators regenerated by electron transfer (ARGET) (Macromolecules, 2006, 39, 39) has been reported to be an improved formulation of ATRP which allows a polymerization reaction to proceed rapidly to a high reaction rate, even under conditions of low catalyst concentration in which a small amount of transition metal complex is used, by reducing the amount of highly oxidized transition metal complexes that cause retardation or termination of polymerization by means of a reducing agent, as previously described, there is no particular distinction made between ATRP and SET in the present invention, and living radical polymerization systems that use a transition metal or transition metal compound and a ligand as the catalyst are considered to be within the scope of the present invention.

<Polymerization Catalyst>

Copper complexes composed of metal copper or a copper compound, and a ligand can be used as the polymerization catalyst. In the present invention, a multidentate amine (A) is used as this ligand.

(Metal Copper or Copper Compound)

The metal copper is copper alone in the form of copper powder, copper foil or the like.

Examples of copper compounds include, but are not limited to, chlorides, bromides, iodides, cyanides, oxides, hydroxides, acetates, sulfates and nitrates.

Although copper atoms can adopt a valence of 0, 1 or 2 depending on their electronic state, there are no limitations on the valence thereof.

The weight of copper atoms is preferably 5 ppm to 30 ppm based on the total weight of (meth)acrylic monomer introduced, and since if the amount of copper is reduced, the copper atoms can be easily removed and then the amount of multidentate amine (A) is reduced correspondingly to the decrease of the transition metal, the weight of copper atoms is more preferably 5 ppm to 15 ppm, even more preferably 5 ppm to 10 ppm, and particularly preferably 5 ppm to 8 ppm. However, in the case that the weight of copper atoms is less than 5 ppm, it is necessary to carry out polymerization for an extremely long period of time in order to obtain a polymer having a narrow molecular weight distribution, which is undesirable.

Since metal copper and copper compounds are solids, it is difficult to introduce them into the reaction system. Hence, they are preferably introduced as a solution by preliminarily mixing with a solvent and the multidentate amine (A) followed by dissolution. In this regard, monovalent copper and divalent copper rather than zero valent copper, or even divalent copper rather than monovalent copper, are preferred since they are more easily dissolved in various types of solvents.

(Multidentate Amine (A))

Although the following lists examples of the multidentate amine used as the ligand, the multidentate amine is not limited thereto.

Bidentate amines: 2,2-bipyridine, 4,4'-di-(5-nonyl)-2,2'-bipyridine, N-(n-propyl)pyridylmethanimine, N-(n-octyl) pyridylmethanimine;

Tridentate amines: N,N,N',N'',N''-pentamethyldiethylenetriamine, N-propyl-N,N-di(2-pyridylmethyl)amine Tetradentate amines: hexamethyltris(2-aminoethyl)amine, N,N-bis(2-dimethylaminoethyl)-N,N'-dimethylethylenediamine, 2,5,9,12-tetramethyl-2,5,9,12-tetraazatetradecane, 2,6,9,13-tetramethyl-2,6,9,13-tetraazatetradecane, 4,11-dimethyl-1,4,8,11-tetraazabicyclohexadecane, N',N''-dimethyl-N',N''-bis((pyridin-2-yl)methyl)ethane-1,2-diamine, tris[(2-pyridyl)methyl]amine, 2,5,8,12-tetramethyl-2,5,8,12-tetraazatetradecane;

Pentadentate amines: N,N,N',N'',N''',N'''',N''''-heptamethyltetraethylenetetramine;

Hexadentate amines: N,N,N',N'-tetrakis(2-pyridylmethyl) ethylenediamine; and

Polyamines: polyethyleneimine.

However, the multidentate amine (A) is preferably represented by general formula (1) or general formula (4) in order to allow the polymerization to proceed at an adequate reaction velocity under conditions of low catalyst concentration in which the total weight of transition metal atoms is 30 ppm or less based on the total weight of (meth)acrylic monomer introduced, and thereby to obtain a polymer having a narrow molecular weight distribution.

(1)

In the formula, $R^1$, $R^2$ and $R^3$ each independently represent a group of general formula (2) or general formula (3):

(2)

wherein $R^4$, $R^5$, $R^6$ and $R^7$ each independently represent a hydrogen atom or an alkyl group having 1 to 3 carbon atoms, or

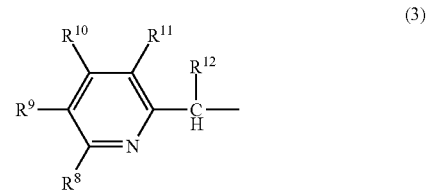

(3)

wherein $R^8$, $R^9$, $R^{10}$, $R^{11}$ and $R^{12}$ each independently represent a hydrogen atom or an alkyl group having 1 to 3 carbon atoms.

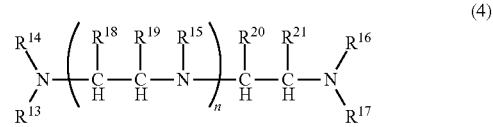

(4)

In the formula, $R^{18}$, $R^{19}$, $R^{20}$ and $R^{21}$ each independently represent a hydrogen atom or an alkyl group having 1 to 3 carbon atoms; and $R^{13}$, $R^{14}$, $R^{15}$, $R^{16}$ and $R^{17}$ each independently represent a group of general formula (2) or general formula (3)

(2)

wherein $R^4$, $R^5$, $R^6$ and $R^7$ each independently represent a hydrogen atom or an alkyl group having 1 to 3 carbon atoms, or

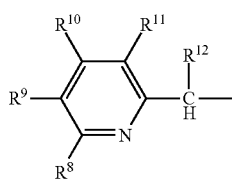

(3)

wherein $R^8$, $R^9$, $R^{10}$, $R^{11}$ and $R^{12}$ each independently represent a hydrogen atom or an alkyl group having 1 to 3 carbon atoms.

With other multidentate amines, a polymer having a narrow molecular weight distribution can also be obtained when the polymerization is carried out over a long period of time; however, the polymer has a broader molecular weight distribution when the polymerization is allowed to proceed for a short period of time, which is undesirable.

Among numerous types of multidentate amines, the specific multidentate amines (A) represented by general formula (1) or general formula (4) are particularly difficult to acquire industrially, and thus there are restrictions on their usage. Specifically, the mole amount of multidentate amine (A) used is preferably 7 mmol % or less, more preferably 4 mmol % or less, even more preferably 2 mmol % or less, and particularly preferably 1 mmol % or less, based on the total amount of (meth)acrylic monomer introduced. Also, the amount of multidentate amine (A) used is preferably 150 mol % or less, more preferably 120 mol % or less, even more preferably 110 mol % or less, and particularly preferably 100 mol % or less, based on the total amount of copper atoms. However, in the case of using an amine represented by general formula (5) as the base (B), if the mole amount of multidentate amine (A) is less than the mole amount of copper atoms, the purity of the complex composed of copper and the multidentate amine (A) decreases, which leads to a broadening in the molecular weight distribution of the polymer. Hence, in the case of using an amine represented by general formula (5) as the base (B), the amount of multidentate amine (A) used is preferably 80 mol % to 150 mol %, more preferably 90 mol % to 120 mol %, even more preferably 95 mol % to 110 mol %, and particularly preferably 100 mol %, based on the amount of transition metal atoms present in the reaction system. On the other hand, in the case of using a base (B) other than that represented by general formula (5), and more specifically, a monoamine or an inorganic base, no complex of the base and copper has an effect on polymerization control due to its low coordination ability. This results in a polymer having a narrow molecular weight distribution. Accordingly, in the case of using a monoamine or inorganic base as the base (B), the mole amount of multidentate amine (A) does not have to exceed the mole amount of copper atoms.

With respect to the order in which the multidentate amine (A) and the base (B) are added to the metal copper or copper compound, in the case that an amine represented by general formula (5) is used as the base (B), the metal copper or copper compound are preferably mixed with the multidentate amine (A) and then with the base (B). If this order is reversed, a polymer having a narrow molecular weight distribution can no longer be obtained. On the other hand, in the case of using a base other than that represented by general formula (5), and more specifically, a monoamine or inorganic base as the base (B), there are no restrictions on the order in which the transition metal or transition metal compound is mixed with the multidentate amine (A) and the base (B) since such a base has no effect on polymerization control due to its low coordination ability.

<Base (B)>

The base (B) is used for the purpose of preventing accumulation of acid by neutralizing acid present in or generated in the polymerization system. The inventors of the present invention presume that acid converts the multidentate amine (A) useful for controlling the reaction to an ammonium salt and thereby disrupts the structure of the copper complex, which consequently makes it impossible to achieve the object of the present invention consisting of polymerization at an adequate polymerization velocity and a high monomer conversion rate, and the obtaining of a polymer having a narrow molecular weight distribution. In actuality, the accumulation of acid has been reported to cause a decrease in polymerization velocity in a system that contains a copper catalyst in a large amount (JP 2007-145507 A). However, there is no description that it leads to a broadening in the molecular weight distribution, and in the above-mentioned report, the reaction system can be said to be substantially different since the amounts of copper and multidentate amine used are 100 times greater than those used in the present invention. In fact, in systems using 100 times greater amounts of copper and multidentate amine, the object of the present invention consisting of reaching a high monomer conversion rate in a short period of time and obtaining a polymer having a narrow molecular weight distribution can be achieved without combining the use of a base. The present invention is based on a strong awareness of the industrial use of living radical polymerization, and, in industrial application, various raw materials are used without purifying; moreover, the solvent and unreacted monomer are recycled and reused several tens of times, thereby resulting in an extremely high likelihood of acid contaminating the polymerization system due to degradation or the like. In the case of ATRP in particular, since a halide initiator and copper halide are used, hydrogen halides are present in the raw materials to a certain extent. In addition, in the case of using a hydride reducing agent such as ascorbic acid as the reducing agent, since hydrogen halides are generated accompanying the reduction of the copper complex, it is more effective to combining the use of the base (B).

The base (B) is any compound that has the property of accepting a proton, as applicable to the definition of a Brønsted base, or any compound that has the property of having an unshared electron pair and being able to donate that unshared electron pair to form a coordinate bond, as applicable to the definition of a Lewis base, and although examples thereof are listed below, the base (B) is not limited thereto.

Monoamine bases: Monoamines refer to compounds each having only one site that acts as a base as defined above per molecule, and examples thereof include, but are not limited to, primary amines such as methylamine, aniline and lysine, secondary amines such as dimethylamine and piperidine, tertiary amines such as trimethylamine and triethylamine, aromatic amines such as pyridine and pyrrole, and ammonia.

Polyamine bases: Examples include diamines such as ethylenediamine and tetramethylethylenediamine, triamines such as diethylenetriamine and pentamethyldiethylenetriamine, tetramines such as triethylenetetramine, hexamethyltriethylenetetramine and hexamethylenetetramine, and polyethyleneimine.

Inorganic bases: Inorganic bases refer to elements or compounds of group 1 or group 2 of the periodic table, and examples thereof include, but are not limited to, elements of group 1 or group 2 of the periodic table such as lithium, sodium and calcium; compounds of group 1 or group 2 of the periodic table such as sodium methoxide, potassium ethoxide, methyllithium, sodium hydroxide, potassium hydroxide, potassium carbonate, sodium bicarbonate, ammonium bicarbonate, trisodium phosphate, disodium hydrogen phosphate, tripotassium phosphate, dipotassium hydrogen phosphate, sodium acetate, potassium acetate, sodium oxalate, potassium oxalate, phenoxysodium, phenoxypotassium, sodium ascorbate and potassium ascorbate; and ammonium hydroxide and salts of weak acids and strong bases.

These may be used alone or a plurality thereof may be used in combination.

Moreover, the base (B) may be added directly to the reaction system or may be generated in the reaction system.

Among these bases, bases other than multidentate amines (A) represented by general formula (1) or general formula (4) are preferred as the base (B) since multidentate amines (A) are difficult to acquire. Examples thereof include, but are not limited to, monoamines, inorganic bases and amines represented by the following general formula (5).

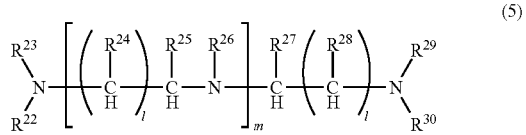

(5)

Moreover, in the case of using an amine represented by general formula (5) as the base (B), it is difficult to remove by evaporation, oil-water separation or the like due to its high boiling point or its high affinity for the polymer and organic solvents. Hence, the base (B) is more preferably a monoamine having a boiling point lower than those of amines represented by general formula (5), or a hydrophilic inorganic base.

Since the base (B) is used in order to protect the multidentate amine (A) from acid, it is preferable that the basicity thereof should be roughly equal to or be stronger than that of the multidentate amine (A), or in other words, the base dissociation constant ($pK_b$) of the base (B) is preferably equal to or less than the $pK_b$ of the multidentate amine (A).

The entire amount of base (B) may be introduced all at once prior to starting the reaction, or may be added gradually during the course of the reaction. However, it is preferable that the base (B) always be in amount of 100 mol % or more based on the amount of electrons transferred by the reducing agent (C) added.

Although there are no particular limitations on the order in which the multidentate amine (A) and the base (B) are added to the metal copper or copper compound, in the case of using an amine represented by general formula (5) as the base (B), the metal copper or copper compound is preferably mixed with the multidentate amine (A) and then with the base (B). If this order is reversed, a polymer having a narrow molecular weight distribution can no longer be obtained. This is because the base (B) represented by general formula (5) ends up forming a complex with copper, thereby lowering the purity of the effective complex formed from the multidentate amine (A) and copper. On the other hand, in the case of using a base other than that represented by general formula (5), and more specifically, a monoamine or inorganic base, there are no restrictions on the order in which the multidentate amine (A) and the base (B) are mixed since such a base has difficulty in forming a complex due to its low coordination ability.

Although there are no particular limitations on the order in which the base (B) and the reducing agent (C) are added to the metal copper or copper compound, in the case of using a hydride reducing agent as the reducing agent (C), since the polymerization velocity decreases and the molecular weight distribution of the polymer broadens when the transition metal atoms are mixed with the reducing agent (C) and then with the base (B), it is preferable that the base (B) and the reducing agent (C) be mixed in the indicated order or simultaneously. This is presumed to be because a hydrogen halide is generated when the reducing agent (C) reduces the transition metal atoms, which causes the multidentate amine (A) to be converted to an ammonium salt. On the other hand, in the case of using a base other than hydride reducing agents, there are no restrictions on the order since acid is not generated accompanying the reduction. However, the term "simultaneously" as used herein indicates mixing at roughly the same time, and is not to be understood strictly.

Since the effect of the base decreases depending on its solubility, in the case of using a base that is difficult to dissolve in the polymerization solvent, it is preferably added as a solution by preliminarily dissolving in a good solvent.

In order to protect the multidentate amine (A), the amount of base (B) added is preferably in excess relative to the multidentate amine. Moreover, in the case of using a hydride reducing agent as the reducing agent (C), since a hydrogen halide is generated when the added reducing agent (C) reduces the transition metal atoms, the amount of base (B) is preferably always 100 mol % or more, more preferably 150 mol % or more, still more preferably 200 mol % or more, and even more preferably 300 mol % or more, based on the amount of electrons transferred by the reducing agent (C). However, in the case of using an amine represented by general formula (5) as the base (B), it is then difficult to remove the base (B) and acid salts thereof, which causes a significant deterioration in color of the polymer. Hence, it is undesirable that the base (B) be added in large excess. More specifically, the base (B) is preferably added in an amount of 2% by weight or less, more preferably 1% by weight or less, even more preferably 0.5% by weight or less, and particularly preferably 0.1% by weight or less, based on the total weight of (meth) acrylic monomer. However, in the case of using a monoamine or inorganic base as the base (B), limitations on using it in excess are no longer applicable since it can be extracted by vacuum evaporation or oil-water separation.

<Reducing Agent (C)>

In living radical polymerization in the presence of a copper complex catalyst, it has been found that the combined use with a reducing agent enhances activity although requiring an excess of ligand (ARGET ATRP). This ARGET ATRP is thought to have enhanced activity by reducing and decreasing highly oxidized transition metal complexes, which cause retardation or termination of reaction, formed by coupling between radicals or the like during polymerization, and it allows the amount of transition metal catalyst, which is generally required to be several hundred to several thousand ppm, to be reduced to several tens to several hundred ppm. In the present invention as well, the reducing agent (C) functions in the same manner as in ARGET ATRP.

Although the following lists examples of the reducing agent used in the present invention, the reducing agent is not limited thereto.

(Reducing Agents not Generating Acid when Reducing Copper Complex)

Metals: Specific examples include alkaline metals such as lithium, sodium and potassium; alkaline earth metals such as beryllium, magnesium, calcium and barium; typical metals such as aluminum and zinc; and transition metals such as copper, nickel, ruthenium and iron. Moreover, these metals may be in the form of alloys (amalgams) with mercury.

Metal compounds: Examples include salts of typical metals or transition metals, salts of typical elements, and complexes coordinated with carbon monoxide, olefins, nitrogen-containing compounds, oxygen-containing compounds, phosphorus-containing compounds, sulfur-containing compounds or the like. Specific examples include compounds of metals and ammonia amines, titanium trichloride, titanium alkoxides, chromium chloride, chromium sulfate, chromium acetate, iron chloride, copper chloride, copper bromide, tin chloride, zinc acetate, zinc hydroxide, carbonyl complexes such as $Ni(CO)_4$ and $Co_2CO_8$, olefin complexes such as $[Ni(cod)_2]$, $[RuCl_2(cod)]$ and $[PtCl_2(cod)]$ (wherein cod represents cyclooctadiene), and phosphine complexes such as $[RhCl(P(C_6H_5)_3)_3]$, $RuCl_2(P(C_6H_5)_3)_2]$ and $[PtCl_2(P(C_6H_5)_3)_2]$.

Organic tin compounds: Specific examples include tin octylate, tin 2-ethylhexylate, dibutyltin diacetate, dibutyltin dilaurate, dibutyltin mercaptide, dibutyltin thiocarboxylate, dibutyltin dimaleate and dioctyltin thiocarboxylate.

Phosphorus or phosphorous compounds: Specific examples include phosphorus, trimethylphosphine, triethylphosphine, triphenylphosphine, trimethyl phosphite, triethyl phosphite, triphenyl phosphite, hexamethylphosphorous triamide and hexaethylphosphorous triamide.

Sulfur or sulfur compounds: Specific examples include sulfur, rongalites, hydrosulfites and thiourea dioxide. Rongalites refer to formaldehyde derivatives of sulfoxylates, and are represented by the formula $MSO_2.CH_2O$ (where M represents Na or Zn). Specific examples include sodium formaldehyde sulfoxylate and zinc formaldehyde sulfoxylate. Hydrosulfites refer to the generic term for sodium hyposulfite and formaldehyde derivatives of sodium hyposulfite.

(Reducing Agents Generating Acid when Reducing Copper Complex (Hydride Reducing Agents))

Metal hydrides: Specific examples include sodium hydride; germanium hydride; tungsten hydride; aluminum hydrides such as diisobutylaluminum hydride, lithium aluminum hydride, sodium aluminum hydride, sodium triethoxyaluminum hydride and sodium bis(2-methoxyethoxy)aluminum hydride; and organic tin hydrides such as triphenyltin hydride, tri-n-butyltin hydride, diphenyltin hydride, di-n-butyltin hydride, triethyltin hydride and trimethyltin hydride.

Silicon hydrides: Specific examples include trichlorosilane, trimethylsilane, triethylsilane, diphenylsilane, phenylsilane and polymethylhydrosiloxane.

Borohydrides: Specific examples include borane, diborane, sodium borohydride, sodium trimethoxyborohydride, sodium borohydride sulfide, sodium cyanoborohydride, lithium cyanoborohydride, lithium borohydride, lithium triethylborohydride, lithium tri-s-butylborohydride, lithium tri-t-butylborohydride, calcium borohydride, potassium borohydride, zinc borohydride and tetra-n-butylammonium borohydride.

Nitrogen hydrides: Specific examples include hydrazine and diimides.

Phosphorus or phosphorous compounds: Specific examples include phosphine and diazaphospholene.

Sulfur or sulfur compounds: Specific examples include hydrogen sulfide.

Hydrogen

Organic compounds exhibiting reducing activity: Specific examples include alcohols, aldehydes, phenols and organic acid compounds. Examples of alcohols include methanol, ethanol, propanol and isopropanol. Examples of aldehydes include formaldehyde, acetoaldehyde, benzaldehyde and formic acid. Examples of phenols include phenol, hydroquinone, dibutylhydroxytoluene and tocopherol. Examples of organic acid compounds include citric acid, oxalic acid, ascorbic acid, ascorbic acid salts and esters of ascorbic acid.

In particular, since the use of a hydride reducing agent that generate acid when reducing the copper complex, without the base (B) leads to a decrease in polymerization velocity and a broadening in molecular weight distribution due to deterioration in polymerization control, the combined use of the hydride reducing agent with the base (B) is more effective. This is presumed to be because the generated acid converts the multidentate amine forming the transition metal complex to an ammonium salt and thereby disrupts the complex structure.

Polymerization can be allowed to proceed more rapidly the greater the reducing power of the reducing agent (C). Specifically, in a case in which an amine is used as the reducing agent (US 2009/0156771), the reaction velocity is not adequate due to the reducing ability of the amine being excessively low. Hence, reducing agents having greater reducing ability than amines, namely reducing agents that easily donate electrons, are preferred. In particular, metals, organic tin compounds, ascorbic acid, esters of ascorbic acid, ascorbic acid salts, hydrazine and borohydrides have strong reducing power and are more preferred.

Moreover, from the viewpoint of industrial application, since it is then necessary to also remove the reducing agent (C) from the polymer, preferred are compounds whose oxides are easily removed by evaporation, such as hydrazine and oxalic acid, and compounds whose oxides are easily removed by oil-water separation, such as sodium hydride, sodium borohydride, hydrazine, citric acid, oxalic acid, ascorbic acid, ascorbic acid salts and esters of ascorbic acid.

Accordingly, ascorbic acid, ascorbic acid salts, esters of ascorbic acid and hydrazine are more preferred, and in particular, ascorbic acid, ascorbic acid salts and esters of ascorbic acid are especially preferred.

These reducing agents (C) may be used alone or two or more types may be used in combination.

Moreover, the reducing agent (C) may be added directly to the reaction system or may be generated in the reaction system. Electrolytic reduction is encompassed in the latter. In the case of electrolytic reduction, electrons generated at the cathode are known to exhibit reducing activity either immediately or after having been first solvated. In other words, a reducing agent formed by electrolysis can also be used as the reducing agent (C).

When the amount of reducing agent (C) added is excessively small, adequate polymerization activity cannot be expected, which is undesirable. When the added amount is excessively large, it becomes difficult to remove the reducing agent (C) from the resulting polymer, which is undesirable. Specifically, the amount of reducing agent (C) added is preferably 10 ppm to 100000 ppm, more preferably 10 ppm to 10000 ppm, even more preferably 10 ppm to 1000 ppm, and particularly preferably 10 ppm to 500 ppm, based on the total weight of (meth)acrylic monomer introduced.

Moreover, in the case that the reducing agent (C) is a solid at ordinary temperature, it is more effective and preferable to add it as a solution by dissolving in a good solvent.

As can be understood from the mechanism of ARGET ATRP, if the reducing agent (C) is added in excess all at once, the divalent copper complex for controlling radicals becomes insufficient and therefore the molecular weight distribution broadens due to coupling or the like. Hence, the reducing agent (C) is preferably added in small portions as the polymerization progresses, and more specifically, it is preferably added at a rate of 10 mol %/hr to 1000 mol %/hr, more preferably at a rate of 20 mol %/hr to 700 mol %/hr, and particularly preferably at a rate of 30 mol %/hr to 500 mol %/hr, based on the copper complex.

Although there are no particular limitations on the order in which the base (B) and the reducing agent (C) are added to the metal copper or copper compound, in the case of using a hydride reducing agent as the reducing agent (C), since the polymerization velocity decreases and the molecular weight distribution of the polymer broadens when the transition metal atoms are mixed with the reducing agent (C) and then with the base (B), it is preferable that the base (B) and the reducing agent (C) be mixed in the indicated order or simultaneously. This is presumed to be because a hydrogen halide is generated when the reducing agent (C) reduces the transition metal atoms, which causes the multidentate amine (A) to be converted to an ammonium salt. On the other hand, in the case of using a base other than hydride reducing agents, there are no restrictions on the order since acid is not generated accompanying the reduction. However, the term "simultaneously" as used herein indicates mixing at roughly the same time, and is not to be understood strictly. In particular, in the case of using ascorbic acid as the reducing agent (C), since its solubility in organic solvents improves as a result of mixing with the base (B) in advance, thereby improving the ease of the procedure, the base (B) and the reducing agent (C) are preferably added simultaneously.

<(Meth)acrylic Monomer (Monomer)>

(Meth)acrylic monomers are conventionally known monomers that are used in living radical polymerization, examples of which include methyl(meth)acrylate, ethyl(meth)acrylate, n-propyl(meth)acrylate, isopropyl(meth)acrylate, n-butyl (meth)acrylate, isobutyl(meth)acrylate, tert-butyl(meth) acrylate, n-pentyl(meth)acrylate, n-hexyl(meth)acrylate, cyclohexyl(meth)acrylate, n-heptyl(meth)acrylate, n-octyl (meth)acrylate, 2-ethylhexyl(meth)acrylate, nonyl(meth) acrylate, decyl(meth)acrylate, dodecyl(meth)acrylate, phenyl(meth)acrylate, toluoyl(meth)acrylate, benzyl(meth) acrylate, 2-methoxyethyl(meth)acrylate, 3-methoxypropyl (meth)acrylate, 2-hydroxyethyl(meth)acrylate, 2-hydroxypropyl(meth)acrylate, stearyl(meth)acrylate, glycidyl(meth)acrylate, 2-aminoethyl(meth)acrylate, γ-(methacryloyloxypropyl)trimethoxysilane, ethylene oxide adducts of (meth)acrylic acid, trifluoromethylmethyl(meth)acrylate, 2-trifluoromethylethyl(meth)acrylate, 2-perfluoroethylethyl (meth)acrylate, 2-perfluoroethyl-2-perfluorobutylethyl (meth)acrylate, 2-perfluoroethyl(meth)acrylate, perfluoromethyl(meth)acrylate, diperfluoromethylmethyl(meth) acrylate, 2-perfluoromethy-1-2-perfluoroethylmethyl(meth) acrylate, 2-perfluorohexylethyl(meth)acrylate, 2-perfluorodecylethyl(meth)acrylate and 2-perfluorohexadecylethyl(meth)acrylate. These may be used alone or a plurality thereof may be copolymerized. Other monomers than (meth)acrylic monomers can also be copolymerized therewith as necessary.

<Initiator>

Organic halides are compounds used as polymerization initiators containing a highly reactive carbon-halogen bond. Examples include carbonyl compounds having a halogen at the α position, compounds having a halogen at a benzyl position, and sulfonyl halide compounds. Specific examples include: $C_6H_5$—$CH_2X$, $C_6H_5$—$C(H)(X)CH_3$, $C_6H_5$—$C(X)(CH_3)_2$ (where $C_6H_5$ represents a phenyl group, and X represents chlorine, bromine or iodine), $R^3$—$C(H)(X)$—$CO_2R^4$, $R^3$—$C(CH_3)(X)$—$CO_2R^4$, $R^3$—$C(H)(X)$—$C(O)R^4$, $R^3$—$C(CH_3)(X)$—$C(O)R^4$ (where $R^3$ and $R^4$ each represent a hydrogen atom, or an alkyl group, aryl group or aralkyl group having 1 to 20 carbon atoms, and X represents chlorine, bromine or iodine), and $R^3$—$C_6H_4$—$SO_2X$ (where $R^3$ represents a hydrogen atom or an alkyl group, aryl group or aralkyl group having 1 to 20 carbon atoms, and X represents chlorine, bromine or iodine).

In addition, organic halides or sulfonyl halide compounds having two or more initiation points may also be used as initiators.

One of the characteristics of living radical polymerization is that the resulting polymer can be set to have a desired molecular weight by adjusting the ratio of the amounts of monomer and initiator.

<Solvent>

Although the following lists examples of usable solvents, there are no particular limitations thereon in this living radical polymerization method.

Highly polar aprotic solvents: Examples include dimethylsulfoxide (DMSO), dimethylformamide (DMF), N,N-dimethylacetoamide (DMAc) and N-methylpyrrolidone.

Carbonate solvents: Examples include ethylene carbonate and propylene carbonate.

Alcohol solvents: Examples include methanol, ethanol, propanol, isopropanol, n-butyl alcohol and tert-butyl alcohol.

Nitrile solvents: Examples include acetonitrile, propionitrile and benzonitrile.

Ketone solvents: Examples include acetone, methyl ethyl ketone and methyl isobutyl ketone.

Ether solvents: Examples include diethyl ether and tetrahydrofuran.

Halogenated carbon solvents: Examples include methylene chloride and chloroform.

Ester solvents: Examples include ethyl acetate and butyl acetate.

Hydrocarbon solvents: Examples include pentane, hexane, cyclohexane, octane, decane, benzene and toluene.

Other examples include ionic liquids and water.

In addition, supercritical fluids may also be used.

The above-mentioned solvents may be used alone or two or more types thereof may be used as a mixture.

Moreover, since it is preferable that the transition metal or transition metal compound, the multidentate amine (A), the base (B), the reducing agent (C), the monomer and the initiator be uniformly present in the reaction system, from the viewpoints of the reaction control, the polymerization reaction velocity, the ease of introduction and the risks associated with increasing the reaction scale, it is preferable to select a solvent that dissolves these raw materials. For example, in the case of using ascorbic acid as the reducing agent, since the solubility thereof has a considerable effect on the reducing power thereof, preferred are solvents capable of dissolving ascorbic acid or salts or esters thereof, including: alcohol solvents such as methanol, ethanol, propanol, isopropanol, n-butyl alcohol and tert-butyl alcohol; highly polar aprotic solvents such as dimethylsulfoxide (DMSO), dimethylformamide (DMF), N,N-dimethylacetoamide (DMAc) and N-methylpyrrolidone; and water. In addition, it is also useful to improve the solubility of ascorbic acid by mixing such a solvent with other solvents.

<Vinyl Polymer Obtained in Present Invention>

The number average molecular weight of the (meth)acrylic polymer obtained according to the production method of the present invention is preferably in the range of 500 to 1000000, more preferably in the range of 1000 to 500000, even more preferably in the range of 3000 to 300000, and particularly preferably in the range of 5000 to 300000 although it is not particularly limited.

The molecular weight distribution of the (meth)acrylic polymer obtained according to the production method of the present invention, namely the ratio between the weight average molecular weight (Mw) and the number average molecular weight (Mn) measured by gel permeation chromatography, is 1.1 to 1.8, and it is preferably 1.1 to 1.7, more preferably 1.1 to 1.5 and even more preferably 1.1 to 1.3. In the GPC measurement in the present invention, chloroform may generally be used as the mobile phase, the measurement may be carried out with a polystyrene gel column, and the number average molecular weight and the like may be determined relative to polystyrene standards.

The conversion rate of the (meth)acrylic monomer or the monomer of the (meth)acrylic polymer obtained according to the production method of the present invention, namely the ratio between the number of moles of (meth)acrylic monomer remaining in the reaction system and the total number of moles of (meth)acrylic monomer introduced, is preferably 85% or more, more preferably 90% or more, and even more preferably 95% or more although it is not particularly limited.

The length of time from the beginning of mixing of all of the metal copper or copper compound, the multidentate amine (A), the base (B) and the reducing agent (C) for the (meth)acrylic polymer obtained according to the production method of the present invention is preferably 360 minutes or less, more preferably 300 minutes or less, and even more preferably 240 minutes or less although it is not particularly limited.

The vinyl polymer main chain obtained according to the production method of the present invention may be linear or branched.

EXAMPLES

Although the following indicates specific examples of the present invention, the present invention is not limited to the following examples. In the following examples and comparative examples, the terms "part(s)" and "ppm" represent "part(s) by weight" and "part(s) per million by weight", respectively. The "number average molecular weight" and the "molecular weight distribution (ratio between weight average molecular weight and number average molecular weight)" were determined by gel permeation chromatography (GPC) relative to polystyrene standards. Here, a column filled with crosslinked polystyrene gel (Shodex GPC K-804, Showa Denko K.K.) was used as the GPC column, and chloroform was used as the GPC solvent. Moreover, $k_p$, represents the ratio between the reaction velocity constant ($k_1$) of Example 1 and the reaction velocity constant ($k_x$) of each of the examples and comparative examples, and is based on the equation $k_p=k_x/k_1$.

Moreover, in consideration of industrial application, the reagents used consisted of those that are produced in large volume, and were used as received, in the reaction without undergoing purification or any other treatment.

Example 1

100 parts of n-butyl acrylate, 80 parts by volume of methanol (MeOH), 1.76 parts of diethyl 2,5-dibromoadipate and 955 ppm of N,N,N'N'-pentamethyldiethylenetriamine (PM-DETA) were introduced and stirred at 55° C. in the presence of flowing nitrogen. A solution obtained by dissolving 107 ppm of copper (Ii) bromide ($CuBr_2$) (copper content: 30 ppm) in 109 ppm (equimolar amount relative to Cu) of hexamethyltris(2-aminoethyl)amine ($Me_6TREN$) having a purity of 96%, and 0.54 parts by volume of N,N-dimethylacetoamide, and a solution obtained by dissolving 17 ppm of ascorbic acid (VC) in 0.12 parts by volume of methanol, were separately prepared, and then added to the mixture to start the reaction. Heating and stirring were continued in such a manner that the temperature of the reaction solution was 50° C. to 60° C., during which the solution obtained by dissolving ascorbic acid in methanol was appropriately added along the way. Once the reaction rate of n-butyl acrylate reached 92 mol % at 160 minutes after the start of polymerization, the pressure inside the reaction vessel was reduced and the volatile component was removed to obtain a polymer [1]. In addition, the reaction velocity constant until the reaction rate reached 92 mol % after the reaction started was calculated and defined as $k_1$. Up to this point, the total amount of ascorbic acid added was 466 ppm, and the total amount of methanol added was 83.9 parts by volume. The polymer [1] at this point had a number average molecular weight of 20200 and a molecular weight distribution of 1.11. Subsequently, the polymer [1] was dissolved in 200 parts by weight of butyl acetate and mixed with 200 parts by weight of water, and the organic phase was then recovered. This extraction procedure was repeated three times, and the resulting phase was evaporated under reduced pressure for 2 hours in a vacuum at 100° C. The color of the resulting polymer was yellowish-brown, and the color became increasingly intense when allowed to stand for several days without any protection from light and the like.

Example 2

100 parts of n-butyl acrylate, 80 parts by volume of methanol, 1.76 parts of diethyl 2,5-dibromoadipate and 955 ppm of triethylamine ($Et_3N$) were introduced and stirred at 45° C. in the presence of flowing nitrogen. A solution obtained by dissolving 107 ppm of copper (II) bromide (copper content: 30 ppm) in 109 ppm (equimolar amount relative to Cu) of hexamethyltris(2-aminoethyl)amine having a purity of 96% and 0.54 parts by volume of N,N-dimethylacetoamide, and a solution obtained by dissolving 17 ppm of ascorbic acid in 0.13 parts by volume of methanol, were separately prepared, and then added to the mixture to start the reaction. Heating and stirring were continued in such a manner that the temperature of the reaction solution was 45° C. to 60° C., during which the solution obtained by dissolving ascorbic acid in methanol was appropriately added along the way. Once the reaction rate of n-butyl acrylate reached 94 mol % at 153 minutes after the start of polymerization, the pressure inside the reaction vessel was reduced and the volatile component was removed to obtain a polymer [2]. In addition, the reaction velocity constant until the reaction rate reached 94 mol % after the reaction started was calculated and defined as $k_2$. Up to this point, the total amount of ascorbic acid added was 432 ppm, and the total amount of methanol added was 81.8 parts by volume. The polymer [2] at this point had a number average molecular weight of 21200 and a molecular weight distribution of 1.10. Subsequently, the polymer [2] was dissolved in 200 parts by weight of butyl acetate and mixed with 200 parts by weight of water, and the organic phase was then recovered. This extraction procedure was repeated three times, and the resulting phase was evaporated under reduced pressure for 2 hours in a vacuum at 100° C. When the total amount of nitrogen contained in the polymer [2] was measured by elemental analysis, the amount of nitrogen atoms contained was only 9 ppm. Although the color of the polymer was slightly yellowish, it was extremely close to being colorless.

Example 3

100 parts of n-butyl acrylate, 80 parts by volume of methanol, 1.76 parts of diethyl 2,5-dibromoadipate and 955 ppm of triethylamine were introduced and stirred at 45° C. in the presence of flowing nitrogen. A solution obtained by dissolving 53 ppm of copper (II) bromide (copper content: 15 ppm) in 54 ppm (equimolar amount relative to Cu) of hexamethyltris(2-aminoethyl)amine having a purity of 96% and 0.27 parts by volume of N,N-dimethylacetoamide, and a solution obtained by dissolving 17 ppm of ascorbic acid in 0.13 parts by volume of methanol, were separately prepared, and then added to the mixture to start the reaction. Heating and stirring were continued in such a manner that the temperature of the reaction solution was 45° C. to 60° C., during which the solution obtained by dissolving ascorbic acid in methanol was appropriately added along the way. Once the reaction rate of n-butyl acrylate reached 94 mol % at 175 minutes after the start of polymerization, the pressure inside the reaction vessel was reduced and the volatile component was removed to obtain a polymer [3]. In addition, the reaction velocity constant until the reaction rate reached 94 mol % after the reaction started was calculated and defined as $k_3$. Up to this point, the total amount of ascorbic acid added was 258 ppm, and the total amount of methanol added was 82.1 parts by volume. The polymer [3] at this point had a number average molecular weight of 20200 and a molecular weight distribution of 1.15.

Example 4

20 parts of n-butyl acrylate, 10 parts by volume of ethanol (EtOH) recovered in Example 4, 1.76 parts of diethyl 2,5-dibromoadipate and 891 ppm of triethylamine were introduced and stirred at 65° C. in the presence of flowing nitrogen. A solution obtained by dissolving 35 ppm of copper (II) bromide (copper content: 10 ppm) in 36 ppm (equimolar amount relative to Cu) of hexamethyltris(2-aminoethyl)amine having a purity of 96% and 1.6 parts by volume of ethanol was prepared and added to the mixture. Moreover, a solution obtained by dissolving 383 ppm of ascorbic acid in 1.1 parts by volume of ethanol was then added at a flow rate of 5.3 eq/hr (relative to the copper complex) to start the reaction. Heating and stirring were continued in such a manner that the temperature of the reaction solution was 70° C. to 75° C., during which 80 parts of n-butyl acrylate was added over the course of 1.5 hours, and the flow rate of the ascorbic acid-ethanol solution was changed to 3.4 eq/hr. Once the reaction rate of n-butyl acrylate reached 95 mol % at 185 minutes after the start of polymerization, the pressure inside the reaction vessel was reduced and the volatile component was removed to obtain a polymer [4]. In addition, the reaction velocity constant until the reaction rate reached 95 mol % after the reaction started was calculated and defined as $k_4$. Up to this point, the total amount of ascorbic acid added was 383 ppm, and the total amount of ethanol added was 12.7 parts by volume. The polymer [4] at this point had a number average molecular weight of 21100 and a molecular weight distribution of 1.18.

Example 5

20 parts of n-butyl acrylate, 10 parts by volume of ethanol, 1.76 parts of diethyl 2,5-dibromoadipate and 431 ppm of triethylamine were introduced and stirred at 65° C. in the presence of flowing nitrogen. A solution obtained by dissolving 29 ppm of copper (II) bromide (copper content: 8 ppm) in 29 ppm (equimolar amount relative to Cu) of hexamethyltris(2-aminoethyl)amine having a purity of 96% and 0.9 parts by volume of ethanol was prepared and added to the mixture. Moreover, a solution obtained by dissolving 91 ppm of ascorbic acid in 0.44 parts by volume of ethanol was then added at a flow rate of 2.3 eq/hr (relative to the copper complex) to start the reaction. Heating and stirring were continued in such a manner that the temperature of the reaction solution was 70° C. to 75° C., during which 80 parts of n-butyl acrylate was added over the course of 1.5 hours, and the flow rate of the ascorbic acid-ethanol solution was changed to 0.8 eq/hr. Once the reaction rate of n-butyl acrylate reached 95 mol % at 240 minutes after the start of polymerization, the pressure inside the reaction vessel was reduced and the volatile component was removed to obtain a polymer [5]. In addition, the reaction velocity constant until the reaction rate reached 95 mol % after the reaction started was calculated and defined as $k_5$. The polymer [5] at this point had a number average molecular weight of 21600 and a molecular weight distribution of 1.22.

Example 6

20 parts of n-butyl acrylate, 10 parts by volume of ethanol, 1.76 parts of diethyl 2,5-dibromoadipate and 431 ppm of triethylamine were introduced and stirred at 65° C. in the presence of flowing nitrogen. A solution obtained by dissolving 18 ppm of copper (II) bromide (copper content: 5 ppm) in 18 ppm (equimolar amount relative to Cu) of hexamethyltris(2-aminoethyl)amine having a purity of 96% and 0.5 parts by volume of ethanol was prepared and added to the mixture. Moreover, a solution obtained by dissolving 153 ppm of ascorbic acid in 0.74 parts by volume of ethanol was then added at a flow rate of 3.4 eq/hr to start the reaction. Heating and stirring were continued in such a manner that the temperature of the reaction solution was 70° C. to 75° C., during which 80 parts of n-butyl acrylate was added over the course of 1.5 hours. Once the reaction rate of n-butyl acrylate reached 93 mol % at 195 minutes after the start of polymerization, the pressure inside the reaction vessel was reduced and the volatile component was removed to obtain a polymer [6]. In addition, the reaction velocity constant until the reaction rate reached 93 mol % after the reaction started was calculated and defined as $k_6$. The polymer [6] at this point had a number average molecular weight of 20500 and a molecular weight distribution of 1.53.

Example 7

100 parts of n-butyl acrylate, 10 parts by volume of ethanol, 1063 ppm of potassium bicarbonate ($KHCO_3$) and 1.76 parts of diethyl 2,5-dibromoadipate were introduced and stirred at 60° C. in the presence of flowing nitrogen. A solution obtained by dissolving 107 ppm of copper (II) bromide (copper content: 30 ppm) in 109 ppm (equimolar amount relative to Cu) of hexamethyltris(2-aminoethyl)amine having a purity of 96% and 3.22 parts by volume of ethanol, and a solution obtained by dissolving 9 ppm of ascorbic acid in 0.04 parts by volume of ethanol, were separately prepared, and then added to the mixture to start the reaction. Heating and stirring were continued in such a manner that the temperature of the reaction solution was 75° C. to 85° C., during which the solution obtained by dissolving ascorbic acid in ethanol was appropriately added along the way. Once the reaction rate of n-butyl acrylate reached 95 mol % at 190 minutes after the start of polymerization, the pressure inside the reaction vessel was reduced and the volatile component was removed to obtain a polymer [7]. In addition, the reaction velocity constant until the reaction rate reached 95 mol % after the reaction started was calculated and defined as $k_7$. Up to this point, the total amount of ascorbic acid added was 111 ppm, and the total amount of ethanol added was 15.8 parts by volume. The polymer [7] at this point had a number average molecular weight of 20400 and a molecular weight distribution of 1.11. Subsequently, the polymer [7] was dissolved in 200 parts by weight of butyl acetate and mixed with 200 parts by weight of water, and the organic phase was then recovered. This extraction procedure was repeated three times, and the resulting phase was evaporated under reduced pressure for 2 hours in a vacuum at 100° C. Although the color of the polymer was slightly yellowish, it was extremely close to being colorless.

Example 8

100 parts of n-butyl acrylate, 60 parts by volume of methanol and 1.76 parts of diethyl 2,5-dibromoadipate were introduced and stirred at 60° C. in the presence of flowing nitrogen. A solution obtained by dissolving 53 ppm of copper (II) bromide (copper content: 15 ppm) in 54 ppm (equimolar amount relative to Cu) of hexamethyltris(2-aminoethyl) amine having a purity of 96% and 0.27 parts by volume of N,N-dimethylacetoamide, a solution obtained by dissolving 67 ppm of sodium bicarbonate ($NaHCO_3$) in 0.081 parts by volume of water, and a solution obtained by dissolving 4 ppm of ascorbic acid in 0.0075 parts by volume of methanol, were separately prepared, and then added to the mixture to start the reaction. Heating and stirring were continued in such a manner that the temperature of the reaction solution was 55° C. to 65° C., during which the aqueous sodium bicarbonate solution and the solution obtained by dissolving ascorbic acid in methanol were appropriately added along the way. Once the reaction rate of n-butyl acrylate reached 94 mol % at 150 minutes after the start of polymerization, the pressure inside the reaction vessel was reduced and the volatile component was removed to obtain a polymer [8]. In addition, the reaction velocity constant until the reaction rate reached 94 mol % after the reaction started was calculated and defined as $k_8$. Up to this point, the total amount of ascorbic acid added was 432 ppm, the total amount of methanol added was 60.8 parts by volume, the total amount of sodium bicarbonate added was 238 ppm, and the total amount of water added was 0.48 parts by volume. The polymer [8] at this point had a number average molecular weight of 19700 and a molecular weight distribution of 1.16. Subsequently, the polymer [8] was dissolved in 200 parts by weight of butyl acetate and mixed with 200 parts by weight of water, and the organic phase was then recovered. This extraction procedure was repeated three times, and the resulting phase was evaporated under reduced pressure for 2 hours in a vacuum at 100° C. Although the color of the polymer was slightly yellowish, it was extremely close to being colorless.

Example 9

100 parts of n-butyl acrylate, 20 parts by volume of methanol, 1.76 parts of diethyl 2,5-dibromoadipate and 597 ppm of triethylamine were introduced and stirred at 60° C. in the presence of flowing nitrogen. A solution obtained by dissolving 53 ppm of copper (II) bromide (copper content: 15 ppm) in 68 ppm (equimolar amount relative to Cu) of tris[(2-pyridyl)methyl]amine (TPMA) having a purity of not less than 95% and 0.27 parts by volume of N,N-dimethylacetoamide, and a solution obtained by dissolving 8 ppm of ascorbic acid in 0.06 parts by volume of methanol, were separately prepared, and then added to the mixture to start the reaction. Heating and stirring were continued in such a manner that the temperature of the reaction solution was 55° C. to 65° C., during which the solution obtained by dissolving ascorbic acid in methanol was appropriately added along the way. Once the reaction rate of n-butyl acrylate reached 89 mol % at 210 minutes after the start of polymerization, the pressure inside the reaction vessel was reduced and the volatile component was removed to obtain a polymer [9]. In addition, the reaction velocity constant until the reaction rate reached 89 mol % after the reaction started was calculated and defined as $k_2$. Up to this point, the total amount of ascorbic acid added was 636 ppm, and the total amount of methanol added was 24.6 parts by volume. The polymer [9] at this point had a number average molecular weight of 18500 and a molecular weight distribution of 1.14.

Comparative Example 1

100 parts of n-butyl acrylate, 80 parts by volume of methanol and 1.76 parts of diethyl 2,5-dibromoadipate were introduced and stirred at 55° C. in the presence of flowing nitrogen. A solution obtained by dissolving 107 ppm of copper (II) bromide (copper content: 30 ppm) in 109 ppm (equimolar amount relative to Cu) of hexamethyltris(2-aminoethyl) amine having a purity of 96% and 0.56 parts by volume of N,N-dimethylacetoamide, and a solution obtained by dissolving 17 ppm of ascorbic acid in 0.10 parts by volume of methanol, were separately prepared, and then added to the mixture to start the reaction. Heating and stirring were continued in such a manner that the temperature of the reaction solution was 50° C. to 60° C., during which the solution obtained by dissolving ascorbic acid in methanol was appropriately added along the way. Although the total amount of ascorbic acid added reached 449 ppm at 220 minutes after starting the reaction, the reaction rate of n-butyl acrylate reached a plateau of 30%. Thus, the pressure inside the reaction vessel was reduced and the volatile component was removed to obtain a polymer [10]. The reaction velocity constant until the reaction rate reached 30% after the reaction started was calculated and defined as $k_{10}$. Up to this point, the total amount of methanol added was 83.3 parts. The polymer [10] at this point had a number average molecular weight of 7200 and a molecular weight distribution of 1.53.

Comparative Example 2

100 parts of n-butyl acrylate, 10 parts by volume of isopropanol and 1.76 parts of diethyl 2,5-dibromoadipate were introduced and stirred at 55° C. in the presence of flowing nitrogen. A solution obtained by dissolving 107 ppm of copper (II) bromide (copper content: 30 ppm) in 109 ppm (equimolar amount relative to Cu) of hexamethyltris(2-aminoethyl)amine having a purity of 96% and 0.54 parts by volume of N,N-dimethylacetoamide, and a solution obtained by dissolving 17 ppm of ascorbic acid in 0.12 parts by volume of isopropanol, were separately prepared, and then added to the mixture to start the reaction without adding any base. Heating and stirring were continued in such a manner that the temperature of the reaction solution was 50° C. to 60° C., during which the solution obtained by dissolving ascorbic acid in isopropanol was appropriately added along the way. After 60 minutes, the total amount of ascorbic acid added was 155 ppm, the reaction rate of n-butyl acrylate was 28 mol %, the number average molecular weight was 8600, and the molecular weight distribution was 1.50. Then, 196 ppm of PMDETA was added thereto, and heating and stirring were still continued in such a manner that the temperature of the reaction solution was 50° C. to 60° C., during which the solution obtained by dissolving ascorbic acid in isopropanol and pentamethyldiethylenetriamine were appropriately added along the way. Once the reaction rate of n-butyl acrylate reached 91 mol %, the pressure inside the reaction vessel was reduced and the volatile component was removed to obtain a polymer [11]. In addition, the reaction velocity constant until the reaction rate reached 91 mol % after the reaction started was calculated and defined as $k_{11}$. Up to this point, the total amount of ascorbic acid added was 274 ppm, and the total amount of isopropanol added was 11.5 parts by volume. The polymer [11] at this point had a number average molecular weight of 20700 and a molecular weight distribution of 2.19, and a GPC curve indicating the molecular weight distribution was bimodal.

Comparative Example 3

100 parts of n-butyl acrylate, 80 parts by volume of methanol, 1.76 parts of diethyl 2,5-dibromoadipate and 955 ppm of triethylamine were introduced and stirred at 60° C. in the presence of flowing nitrogen. A solution obtained by dissolving 107 ppm of copper (II) bromide (copper content: 30 ppm) in 109 ppm (equimolar amount relative to Cu) of hexamethyltris(2-aminoethyl)amine having a purity of 96% and 0.54 parts by volume of N,N-dimethylacetoamide was separately prepared and added to the mixture to start the reaction. Heating and stirring were continued in such a manner that the temperature of the reaction solution was 55° C. to 60° C. At 90 minutes after the start of polymerization, the reaction rate of n-butyl acrylate was 0 mol %. Then, 11460 ppm of triethylamine was added followed by heating and stirring for 120 minutes; however, the reaction rate remained at 0 mol %.

and 6 in particular, the reaction was allowed to proceed at an adequate reaction velocity to a high monomer reaction rate even under conditions of an extremely small amount of copper and an equimolar amount of multidentate amine (A) relative to the copper; moreover, a polymer with a narrow molecular weight distribution was able to be synthesized. In addition, in Examples 2 to 6 in which a monoamine was used as the base (B), improvements in the amount of nitrogen and coloration of the polymer obtained after evaporation and water washing were able to be confirmed in comparison with Example 1 in which PMDETA, having a high boiling point and high lypophilicity, was used as the base (B).

Moreover, in Examples 7 and 8 in which an inorganic base was used as the base (B), the polymerization was able to achieve a high monomer conversion rate in a short period of time and a narrow molecular weight distribution, as achieved in Examples 2 and 5 in which triethylamine was used as the base (B). This results demonstrate that, in the system according to the present invention, unlike systems using an amine as the reducing agent as previously reported, the amine and the inorganic base act as bases that trap acid. In addition, the color of these polymers was extremely as light as when triethylamine was used.

On the other hand, in Comparative Example 1, although the multidentate amine (A) and the reducing agent (C) were used together, the base (B) was not used. The reaction rate was about 1/10 that of Examples 1 to 8, and the monomer reaction

TABLE 1

| | Metal compound Cu content[1] | Multidentate amine (A) Type | Amount | Base (B) Type | Amount | Reducing agent (C) VC | Solvent | Time (min) | $K_p$[2] | Conv | $M_n$ | $M_w/M_n$ |
|---|---|---|---|---|---|---|---|---|---|---|---|---|
| Example 1 | CuBr$_2$ 30 ppm | Me$_6$TREN | 6.1 mmol % | PMDETA | 955 ppm | 466 ppm | MeOH | 160 | 1.00 | 92% | 20200 | 1.11 |
| Example 2 | CuBr$_2$ 30 ppm | Me$_6$TREN | 6.1 mmol % | Et$_3$N | 955 ppm | 432 ppm | MeOH | 153 | 1.30 | 94% | 21200 | 1.10 |
| Example 3 | CuBr$_2$ 15 ppm | Me$_6$TREN | 3.0 mmol % | Et$_3$N | 955 ppm | 258 ppm | MeOH | 175 | 1.14 | 94% | 20200 | 1.15 |
| Example 4 | CuBr$_2$ 10 ppm | Me$_6$TREN | 1.8 mmol % | Et$_3$N | 891 ppm | 383 ppm | EtOH | 185 | | 95% | 21100 | 1.18 |
| Example 5 | CuBr$_2$ 5 ppm | Me$_6$TREN | 1.0 mmol % | Et$_3$N | 431 ppm | 153 ppm | EtOH | 195 | 1.06 | 93% | 20500 | 1.53 |
| Example 6 | CuBr$_2$ 30 ppm | Me$_6$TREN | 6.1 mmol % | KHCO$_3$ | 1063 ppm | 111 ppm | EtOH | 190 | 1.49 | 94% | 19700 | 1.16 |
| Example 7 | CuBr$_2$ 15 ppm | Me$_6$TREN | 3.0 mmol % | NaHCO$_3$ | 238 ppm | 432 ppm | MeOH | 150 | 1.49 | 94% | 19700 | 1.16 |
| Example 8 | CuBr$_2$ 15 ppm | TPMA | 3.0 mmol % | Et$_3$N | 597 ppm | 636 ppm | MeOH | 210 | 0.75 | 89% | 18500 | 1.14 |
| Comparative Example 1 | CuBr$_2$ 30 ppm | Me$_6$TREN | 6.1 mmol % | — | | 449 ppm | MeOH | 220 | 0.11 | 30% | 7200 | 1.53 |
| Comparative Example 2 | CuBr$_2$ 30 ppm | Me$_6$TREN | 6.1 mmol % | — PMDETA | 196 ppm | 155 ppm 274 ppm | iPrOH | 60 175 | 0.23 1.04 | 28% 91% | 8600 20700 | 1.50 2.19 |
| Comparative Example 3 | CuBr$_2$ 30 ppm | Me$_6$TREN | 6.1 mmol % | Et$_3$N | 12415 ppm | — | MeOH | 210 | 0.00 | 0% | — | — |

The above-mentioned results are summarized in Table 1. As shown in Examples 1 to 9, in a system in which all three types of components consisting of a multidentate amine (A), a base (B) and a reducing agent (C) were added to metal copper or a copper compound, even under dilute conditions in which the weight of copper atoms was 30 ppm or less based on the total weight of (meth)acrylic monomer introduced, and the amount of multidentate amine was an equimolar amount relative to the copper atoms, the polymerization was allowed to proceed at an adequate reaction velocity so that the conversion rate of the (meth)acrylic monomer exceeded 85% in 360 minutes; moreover, a polymer having a narrow molecular weight distribution was able to be synthesized. In Examples 5 rate ended up reaching a plateau of 30%. In addition, the molecular weight distribution tended to broaden and was considerably inferior to the examples. It is suggested from this results that the base (B) is also an essential component along with the multidentate amine (A) and the reducing agent (C). Moreover, in Comparative Example 2, polymerization was similarly carried out in the absence of the base (B) during the first half of the polymerization, after which the base (B) was added. Although the reaction velocity during the first half was as slow as in Comparative Example 1, as the base (B) was added along the way, the reaction velocity was improved and the reaction reached a high (meth)acrylic monomer conversion rate. However, the molecular weight distribution of the polymer was largely broadened and the reaction was unable to be controlled. On the basis of these findings, it is suggested that the base (B) and the reducing agent (C) are preferably added in the indicated order to the polymerization system, and that in the case of not combining the use of the base (B), not only does the reaction velocity decrease, but the molecular weight distribution ends up broadening. Incidentally, since Comparative Example 2, which used a different solvent from that in Comparative Example 1, demonstrated roughly the same molecular weight distribution at roughly the same monomer conversion rate as in Comparative Example 1, the type of solvent can be said to have hardly any effect.

In Comparative Example 3, although the multidentate amine (A) and the base (B) were used together, the reducing agent (C) was not used. Previous reports disclosed that by using copper at about 70 ppm and combining the multidentate amine (A) and the base (B), a rapid polymerization, a high monomer conversion rate and a polymer having a narrow molecular weight distribution were achieved. However, when the inventors of the present invention conducted similar studies using 30 ppm of copper, the monomer was not consumed and polymerization did not proceed even though heating and stirring were carried out for 220 minutes. Accordingly, it can be said that, when the amount of copper complex is reduced to 30 ppm or less, polymerization is unable to proceed unless the reducing agent (C) is used together. In other words, the reducing agent (C), along with the multidentate amine (A) and the base (B), is suggested to be indispensable for allowing the polymerization reaction to proceed rapidly and achieving a high (meth)acrylic monomer conversion rate.

On the basis of the above results, in a method for polymerizing a (meth)acrylic monomer by living radical polymerization in the presence of a transition metal complex catalyst, the combined use of three types of components consisting of the multidentate amine (A), the base (B) and the reducing agent (C) made it possible to allow the polymerization to proceed at an adequate reaction velocity to a high monomer reaction rate, and thereby to obtain a polymer having a narrow molecular weight distribution, even under dilute catalyst conditions in which the amount of transition metal atoms is 30 ppm or less based on the monomer, and the amount of multidentate amine (A) is extremely as small as a nearly equimolar amount relative to the transition metal atoms.

INDUSTRIAL APPLICABILITY

In the polymerization method for forming a (meth)acrylic polymer according to the present invention, the combined use of a multidentate amine, a base other than the multidentate amine, and a reducing agent makes it possible to allow a polymerization reaction to proceed rapidly to a high monomer reaction rate, and thereby to obtain a polymer having a narrow molecular weight distribution, even under conditions of low catalyst concentration in which the total weight of copper serving as catalyst is 5 ppm to 30 ppm and the amount of multidentate amine is 7 mmol % or less, each based on the total amount of (meth)acrylic monomer introduced, and the amount of multidentate amine is 150 mol % or less based on the total amount of copper atoms, thereby succeeding in reducing the labor required for removing the catalyst, raw material costs, and production time.

The invention claimed is:

1. A method for producing a (meth)acrylic polymer, comprising living radical polymerization of a (meth)acrylic monomer in the presence of a copper complex catalyst, wherein, based on the total amount of (meth)acrylic monomer introduced, 5 to 30 ppm by weight of copper atoms and a mole amount of 0.007 mol % or less of a multidentate amine (A) are contained, the multidentate amine (A) being in an amount of 150 mol % or less based on the total amount of copper atoms, wherein a base (B) other than the multidentate amine (A), and a reducing agent (C) are contained in a reaction system, and wherein the resulting (meth)acrylic polymer has a molecular weight distribution of 1.1 to 1.8, and wherein the base (B) is at least one of a monoamine compound and an inorganic compound.

2. The method for producing a (meth)acrylic polymer according to claim 1, wherein the multidentate amine (A) is represented by general formula (1):

wherein $R^1$, $R^2$ and $R^3$ each independently represent a group of general formula (2) or general formula (3):

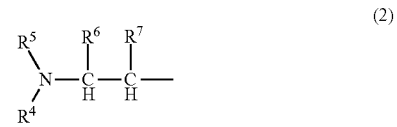

wherein $R^4$, $R^5$, $R^6$ and $R^7$ each independently represent a hydrogen atom or an alkyl group having 1 to 3 carbon atoms, or

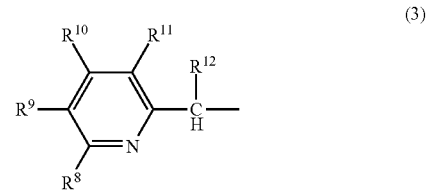

wherein $R^8$, $R9$, $R^{10}$, $R^{11}$ and $R^{12}$ each independently represent a hydrogen atom or an alkyl group having 1 to 3 carbon atoms.

3. The method for producing a (meth)acrylic polymer according to claim 1, wherein the multidentate amine (A) is represented by general formula (4):

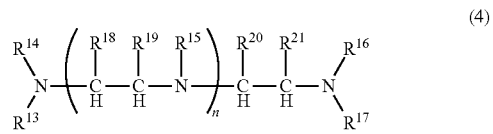

wherein n represents a number of 0 to 3; $R^{18}$, $R^{19}$, $R^{20}$ and $R^{21}$ each independently represent a hydrogen atom or an alkyl group having 1 to 3 carbon atoms; and $R^{13}$, $R^{14}$, $R^{15}$, $R^{16}$ and $R^{17}$ each independently represent a group of general formula (2) or general formula (3):

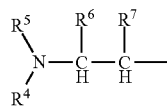
(2)

wherein $R^4$, $R^5$, $R^6$ and $R^7$ each independently represent a hydrogen atom or an alkyl group having 1 to 3 carbon atoms, or

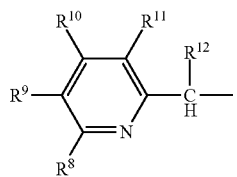
(3)

wherein $R^8$, $R^9$, $R^{10}$, $R^{11}$ and $R^{12}$ each independently represent a hydrogen atom or an alkyl group having 1 to 3 carbon atoms.

4. The method for producing a (meth)acrylic polymer according to claim 1, wherein the reducing agent (C) is at least one selected from the group consisting of a metal, an organic tin compound, ascorbic acid, an ester of ascorbic acid, an ascorbic acid salt, hydrazine or a borohydride.

5. The method for producing a (meth)acrylic polymer according to claim 1, wherein the reducing agent (C) is a hydride reducing agent.

6. The method for producing a (meth)acrylic polymer according to claim 1, wherein the reducing agent (C) is at least one selected from the group consisting of hydrazine, ascorbic acid, an ester of ascorbic acid and an ascorbic acid salt.

7. The method for producing a (meth)acrylic polymer according to claim 1, wherein the reducing agent (C) is at least one selected from the group consisting of ascorbic acid, an ester of ascorbic acid and an ascorbic acid salt.

8. The method for producing a (meth)acrylic polymer according to claim 1, wherein the base (B) is present in the reaction system, in an amount of 100 mol % or more based on the amount of electrons transferred by the reducing agent (C) present in the reaction system.

9. The method for producing a (meth)acrylic polymer according to claim 1, wherein the copper atoms are mixed with the base (B) either simultaneously with or prior to mixing with the reducing agent (C).

10. The method for producing a (meth)acrylic polymer according to claim 1, wherein the length of time from the beginning of mixing of all of the metal copper or copper compound, the multidentate amine (A), the base (B) and the reducing agent (C) until the conversion rate of the (meth) acrylic monomer reaches 85% or more is 360 minutes or less.

* * * * *